(12) United States Patent
Read

(10) Patent No.: US 10,359,338 B2
(45) Date of Patent: Jul. 23, 2019

(54) ASSESSING INTEGRITY OF BONDED JOINTS

(71) Applicant: BAE Systems plc, London (GB)

(72) Inventor: Ian James Read, Bristol (GB)

(73) Assignee: BAE Systems plc, London (GB)

( * ) Notice: Subject to any disclaimer, the term of this patent is extended or adjusted under 35 U.S.C. 154(b) by 247 days.

(21) Appl. No.: 15/105,263

(22) PCT Filed: Dec. 15, 2014

(86) PCT No.: PCT/EP2014/077820
§ 371 (c)(1),
(2) Date: Jun. 16, 2016

(87) PCT Pub. No.: WO2015/091390
PCT Pub. Date: Jun. 25, 2015

(65) Prior Publication Data
US 2016/0313210 A1   Oct. 27, 2016

(30) Foreign Application Priority Data

Dec. 19, 2013  (EP) .................................... 13275326
Dec. 19, 2013  (GB) .................................. 1322516.4

(51) Int. Cl.
*G02B 6/36*  (2006.01)
*G01M 11/08*  (2006.01)
(Continued)

(52) U.S. Cl.
CPC .......... *G01M 11/086* (2013.01); *B29C 65/50* (2013.01); *B64D 45/00* (2013.01); *G02B 6/3644* (2013.01);
(Continued)

(58) Field of Classification Search
CPC . G02B 6/10; G02B 6/102; G02B 6/12; G02B 6/103; G02B 6/3608; G02B 6/3897
See application file for complete search history.

(56) References Cited

U.S. PATENT DOCUMENTS 5,250,802 A   10/1993   Runner
5,604,836 A   2/1997    Dunphy et al.
(Continued)

FOREIGN PATENT DOCUMENTS

DE   102011084579 A1   4/2013
EP       0573778 A1   12/1993
(Continued)

OTHER PUBLICATIONS

PCT Search Report dated Apr. 13, 2015 of PCT Application No. PCT/EP2014/077820 filed Dec. 15, 2014.
(Continued)

*Primary Examiner* — Sung H Pak
*Assistant Examiner* — Hoang Q Tran
(74) *Attorney, Agent, or Firm* — Maine Cernota & Rardin

(57) ABSTRACT

There is provided apparatus and a method for assessing the integrity of a bonded joint and a bonded joint assembly. The assembly has a bonded joint monitored for bond integrity and comprises first (1) and second (2) components each defining a bonding surface (3,4); the joint (5) is formed between the bonding surfaces (3,4) and the first component (1) defines a passage (15) therethrough from the bonding surface to an exterior of the component. The joint (5) includes an optical fiber (11) extending along the joint (5) between the bonding surfaces, through the passage (15) and emerging from the passage (15) to the exterior of the component. The method of constructing the assembly includes the steps of passing the optical fiber (11) through the passage (15) and adhering the optical fiber (11) to the
(Continued)

bonding surface (3) of the first component (1), thus bringing the two bonding surfaces (3,4) together and forming the bond (5).

18 Claims, 5 Drawing Sheets

(51) Int. Cl.
    *B29C 65/50*          (2006.01)
    *B64D 45/00*         (2006.01)
    *B29L 11/00*           (2006.01)
    *B29C 65/48*           (2006.01)
    *B29C 65/00*           (2006.01)
    *B29L 31/08*           (2006.01)
    *B29L 31/30*           (2006.01)
    *B64C 1/00*            (2006.01)
    *B29C 65/82*           (2006.01)

(52) U.S. Cl.
    CPC .......... *B29C 65/48* (2013.01); *B29C 65/4835* (2013.01); *B29C 65/82* (2013.01); *B29C 66/1122* (2013.01); *B29C 66/45* (2013.01); *B29C 66/50* (2013.01); *B29C 66/69* (2013.01); *B29C 66/721* (2013.01); *B29L 2011/0075* (2013.01); *B29L 2031/085* (2013.01); *B29L 2031/3076* (2013.01); *B29L 2031/3082* (2013.01); *B29L 2031/3085* (2013.01); *B64C 2001/0072* (2013.01); *B64D 2045/0085* (2013.01); *Y02P 70/523* (2015.11)

(56) References Cited

U.S. PATENT DOCUMENTS 6,173,090 B1 *   1/2001   Simon ..................... G02B 6/26
                                                                         156/253
2014/0072757 A1 *   3/2014   Wyrwich ............. G02B 6/3897
                                                                         428/99

FOREIGN PATENT DOCUMENTS

| EP | 0757238 A1 | 5/1997 |
| WO | 0026710 A1 | 5/2000 |
| WO | 0151976 A1 | 7/2001 |
| WO | 2005103786 A1 | 11/2005 |

OTHER PUBLICATIONS

EP Search Report dated May 7, 2014 of Patent Application No. 13275326.0 filed Dec. 19, 2013.

GB Search Report dated Jun. 10, 2014 of Patent Application No. 1322516.4 filed Dec. 19, 2013.

Kang H K et al: "Development of fibre optic ingress/egress methods for smart composite structures", Smart Materials and Structures, IOP Publishing Ltd., Bristol, GB, vol. 9, No. 2, Apr. 1, 2000, pp. 149-156, XP020071340, ISSN: 0964-1726, DOI: 10.1088/0964-1726/9/2/304. (Obtained online on Jun. 16, 2016 from https://www.researchgate.net/profile/Chun-Gon_Kim/publications/7).

International Preliminary Report on Patentability and Written Opinion for PCT Application No. PCT/EP2014/077820, dated Jun. 30, 2016, 7 pages.

* cited by examiner

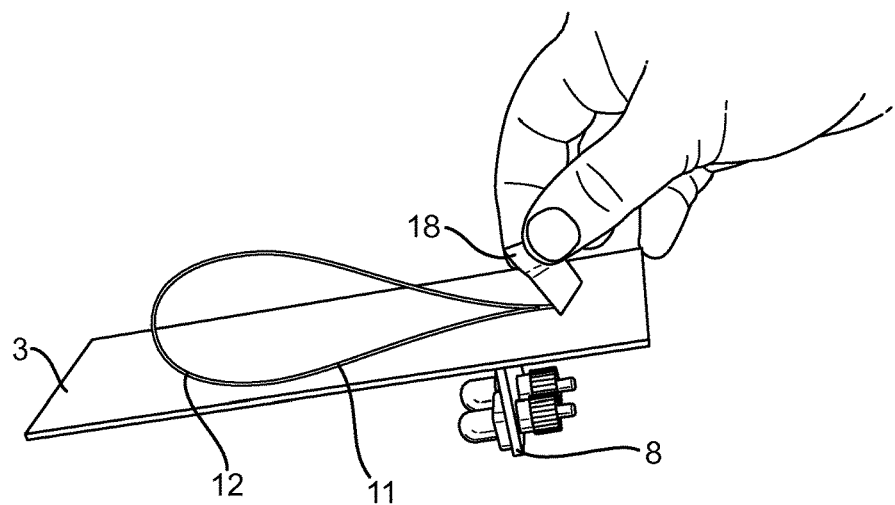
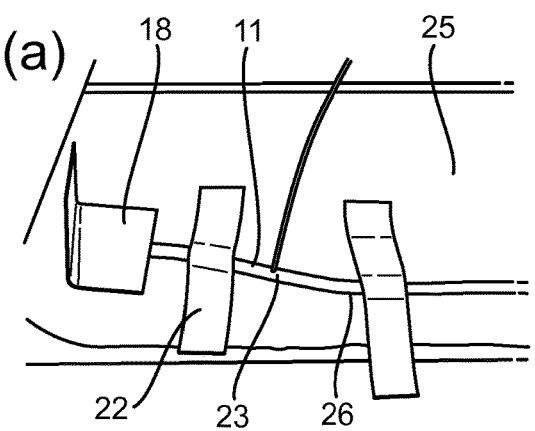
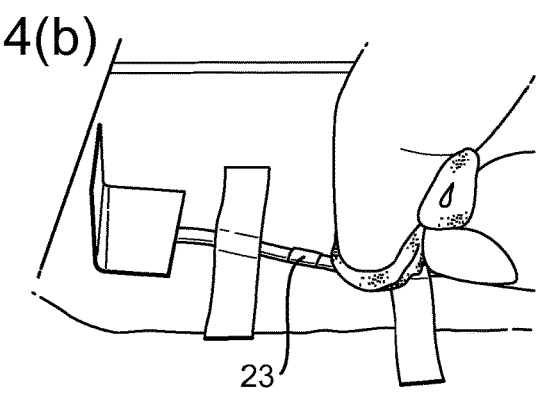

ature that a particular difficulty with such a system would be getting damage information from the bond as the bond is, by definition, located between parts of a unified structure. In addition, any edges of such a bonded joint will often be inaccessible owing to the way in which the component is structured. In assemblies containing bonded joints, those joints may butt up against one another making the edge of the joint inaccessible. Where the bond edge is accessible, an optical fibre cannot emerge through it without protection as it will be liable to break. Protection schemes, such as tubing, are likely to adversely affect the strength of the bond, making such an approach inappropriate.

ASSESSING INTEGRITY OF BONDED JOINTS

RELATED APPLICATIONS

This application is a national phase application filed under 35 USC § 371 of PCT Application No. PCT/EP2014/077820 with an International filing date of Dec. 15, 2014 which claims priority of GB Patent Application 1322516.4 filed Dec. 19, 2013 and EP Patent Application 13275326.0 filed Dec. 19, 2013. Each of these applications is herein incorporated by reference in their entirety for all purposes.

FIELD

This invention relates to assessment of the integrity of bonded joints in components and in particular to assessment of the bond integrity of fibre reinforced composite structures.

BACKGROUND

The integrity of high strength bonded structures is often critical, for example in aircraft, and any failure of such a structure, like a carbon fibre wing, for example, could be critical to the safety of the aircraft. The problem of assessing bond integrity may be equally important for structures which are not necessarily safety critical but which are either extremely expensive, such as large wind turbines, or which are expected to perform for long periods reliably and which may be difficult to access, such as building structures.

Such bonded structures may be of fibre-reinforced composite material or may be metallic structures, such as bonded aluminium vehicle bodies.

It is known to place fibres within fibre-reinforced composite components whose failure, due to impact damage for example, may send an electrical signal to a processor to alert an operator. To date, however, no such solution is known for assessing the integrity of bonds between parts of a structure. It is envisaged that a particular difficulty with such a system would be getting damage information from the bond as the bond is, by definition, located between parts of a unified structure. In addition, any edges of such a bonded joint will often be inaccessible owing to the way in which the component is structured. In assemblies containing bonded joints, those joints may butt up against one another making the edge of the joint inaccessible. Where the bond edge is accessible, an optical fibre cannot emerge through it without protection as it will be liable to break. Protection schemes, such as tubing, are likely to adversely affect the strength of the bond, making such an approach inappropriate.

Bonded structures likely to cause particular difficulty with both inspection and access, for optical fibre damage detection, are airframe structures, in particular wings and fuselages, where a clean aerodynamic surface is required on one side of the structure and where they may be no accessible edge to the structure from which to access the ends of optical fibres embedded in the structure.

SUMMARY

According to a first aspect of the present invention there is provided an assembly having a bonded joint monitored for bond integrity, the assembly comprising first and second components each defining a bonding surface thereon, the joint being formed between the bonding surfaces, the first component defining a passage therethrough from the bonding surface to an exterior of the component, the joint including an optical fibre extending along the joint between the bonding surfaces, through the passage and emerging from the passage to the exterior of the component.

The passage may be directed and dimensioned whereby to allow the optical fibre to pass therethrough while defining a bend radius which allows light to pass along the optical fibre. To this end, the passage may be angled with respect to the joint.

The assembly preferably includes a support for the emerging optical fibre and the support may include an end connector for the optical fibre attached to the support.

The support may further include a casing for the emerging optical fibre such as a flexible hollow tube.

The casing may penetrate the passage, whereby to give support to the optical fibre from within the first component.

The optical fibre is likely to be vulnerable to damage, as it changes direction when turning through the passage from the joint. The optical fibre may therefore be potted within the passage, for example in an epoxy resin, to give the fibre further support in this vulnerable length of fibre.

The optical fibre may have light input at one end thereof and a light sensing arrangement at or near the other end thereof. For such an arrangement, the optical fibre may form a loop within the joint.

For reasons of structural integrity of the assembly, a number of optical fibres may pass through a single passage rather than a number of passages.

The assembly of the invention may be of particular benefit in high strength fibre-reinforced composite structures where the integrity of bonds between composite components or parts of a composite structure is critical. Examples of such structures are building or vehicle structures, in particular aircraft components such as aerofoils, fuselages and components thereof. Thus, at least one of the first and second components may comprise a fibre-reinforced composite structure and may comprise an aircraft structural airframe component.

According to a second aspect of the present invention there is provided a method of constructing an assembly having a bonded joint monitored for bond integrity, the assembly comprising first and second components each defining a bonding surface thereon, the joint being formed between the bonding surfaces, the first component defining a passage therethrough from the bonding surface to an exterior of the component, the joint including an optical fibre extending along the joint between the bonding surfaces, through the passage and emerging from the passage to the exterior of the component, the method including the steps of passing the optical fibre through the passage and adhering the optical fibre to the bonding surface of the first component, bringing the two bonding surfaces together and forming the bond.

The step of adhering the optical fibre to the bonding surface of the first component may comprise applying adhesive to adhere the optical fibre to the bonding surface at selected locations on the bonding surface and securing the optical fibre in position while the adhesive sets.

The step of securing the optical fibre in position may comprise applying adhesive tape to the bonding surface of the first component whereby to secure the optical fibre in position while the adhesive sets. The adhesive tape may be applied to the bonding surface of the first component over the adhesive.

In order to protect the vulnerable optical fibre passing through the passage in the first component, while securing the optical fibre in position, adhesive tape may be applied to the bonding surface over an entrance to the passage.

BRIEF DESCRIPTION OF THE DRAWINGS

The invention will now be further described by way of example, with reference to the accompanying drawings in which:

FIG. 3 is a perspective view of the part assembly of FIG. 2, inverted;

FIGS. 4a and 4b are perspective views of the bonding face of a part assembly, similar to that shown in FIG. 2, covered by a track mask;

DETAILED DESCRIPTION

Figure 1:
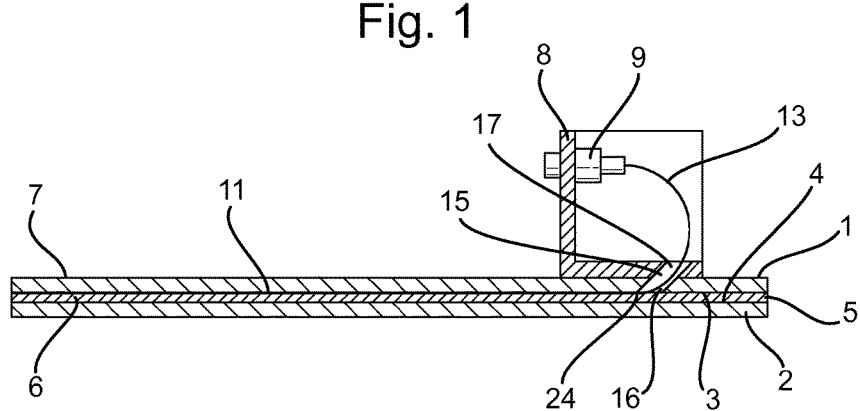
FIG. 1 is a schematic vertical section through an assembly according to the invention.

In FIG. 1 an assembly according to the invention comprises first and second fibre-reinforced composite components 1, 2 each having a bonding surface 3, 4 facing the other. A bonded joint 5, is formed between the bonding surfaces 3, 4. Bonding together the bonding surfaces of the first and second components 1, 2 is a layer 6 of epoxy resin adhesive.

Attached to an exterior surface 7 of the first component 1 by adhesive is a metal bracket 8. The bracket 8 supports a pair of a fibre end connectors 9, 10 (only one of which appears in FIG. 1) each of which is connected to an end of an optical fibre 11. The optical fibre 11 extends in a loop 12 (see also FIGS. 3 and 4) within the joint 5 and has radiused terminal portions 13, 14 extending from the joint 5 to the end connectors 9, 10.

Each radiused terminal portion 13, 14 passes through a circular drilled passage 15. The passage 15 has a component portion 16, drilled through the first component 1, and a bracket portion 17 drilled through the bracket 8. Both portions 16 and 17 are drilled at an angle of 45 deg. to the bonding surface 3. As it is important that the two portions 16, 17 of the passage are perfectly aligned, a mandrel (not shown) may be inserted through both portions 16 and 17 as the bracket is being attached to the first component 1.

It will be observed that the passage is of considerably larger diameter than the optical fibre 11, thereby allowing the fibre to curve within the passage. It would clearly be possible to form the passage 15 with curvature to match the diameter and intended curvature of the optical fibre 11. This could be achieved by laser drilling, for example, or an alternative forming process. However, for simplicity and to save cost, it is simpler simply to drill conventionally a hole for the passage which is of larger diameter.

The point of entry 24 of the optical fibre 11 into the joint 5 is vulnerable, owing to the transition from it being relatively straight within the joint 5 to the much tighter curvature of the terminal portions 13, 14. Great care when feeding the fibre 11 through the passage 15 is therefore required. The terminal portions 13, 14 emerging from the passage 15 are also vulnerable and some form of protection is likely to be required. The long term functionality of optical fibre can be compromised if subjected to excessively tight bends. Thus, a suitable bend radius must be calculated.

In this example, a 4.5 mm passage 15 is drilled in the first component 1 at approximately 45° and burrs are removed from the edges of the passage. A length of single mode fibre 11 is then fed through the passage and held in place using adhesive tape 18. The tape 18 is to ensure that the fibre 11 emerges from the passage at a shallow angle which will minimise local stresses on the fibre and reduce the risk of it breaking.

Short lengths 19, 20 of PTFE tubing are then fitted over the fibre 11 on the other side of the first component 1 with their ends being placed into the passage 15. This tubing should not enter the joint 5.

Figure 7A:
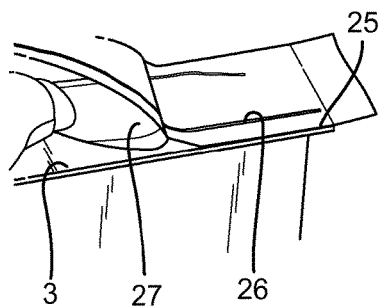
FIGS. 7a and 7b show fitting of a track mask to a bonding face of the part assembly of FIGS. 4a and 4b.
Figure 7B:
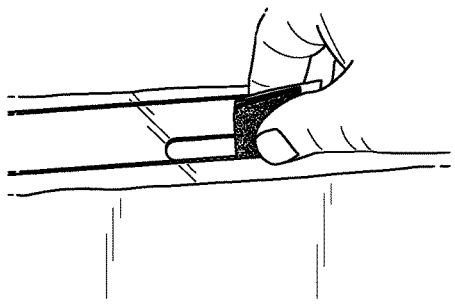

A track mask 25 is a length of masking tape pre-cut with a track 26 that the fibre 11 will take when bonded to the bonding surface 3. FIGS. 7(a) and 7(b) show how the track mask 25 can be peeled away from its backing paper 27 and applied to the bonding surface 3.

Figure 8:
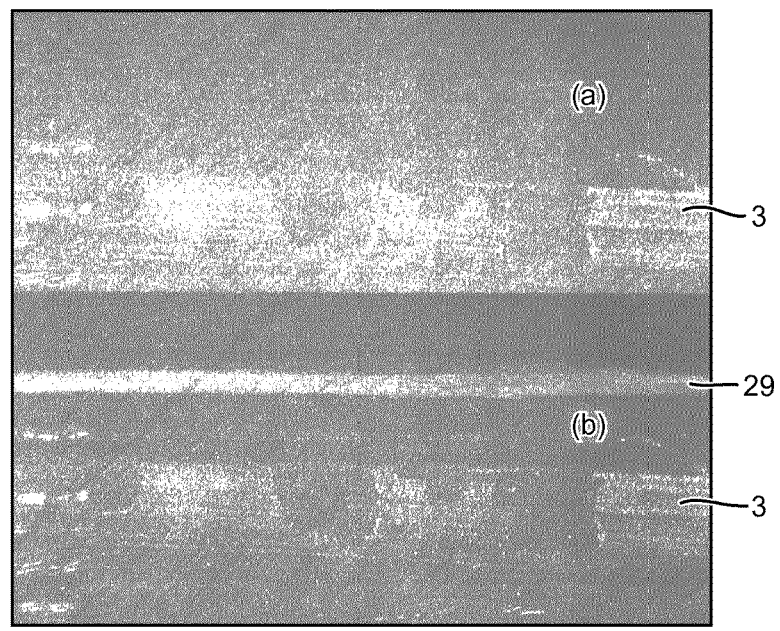
FIGS. 8a and 8b show the effect of smoothing a portion of the bonding surface of FIGS. 7a and 7b.

If designed for a specific component, the track mask 25 may also contain alignment marks (not shown) which can be used during one or more steps in the assembly procedure. Once the track mask 25 is fitted to the bonding surface 3 it can be used as a guide to smooth the material, here carbon fibre, of the exposed track 26. Fine emery paper 28 may be used for smoothing; a lollypop stick (not shown) makes an ideal sanding block for the narrow tracks 26. The aim is to remove small scale roughness of the bonding surface 3 but not to wear into the carbon fibres; thus, the track 26 should only be lightly abraded until a smooth finish is achieved. Once smoothed, the track 26 should be cleared of dust using a tissue. FIGS. 8a and 8b show the effect of smoothing the fibre track 26 close-up: FIG. 8(a) shows the pristine composite and FIG. 8(b) shows a line 29 where the surface of the track 26 has been smoothed.

Figure 2:
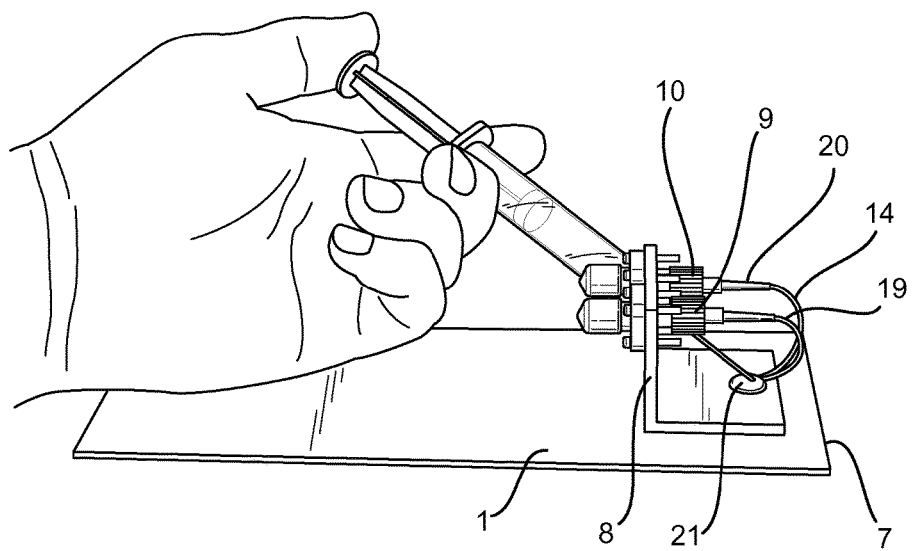
FIG. 2 is a perspective view of part of the assembly of FIG. 1 having adhesive injected into a passage.

Referring to FIG. 2, the optical fibre 11 will be vulnerable where it leaves the passage 15. Thus the passage 15 is filled with epoxy adhesive 21, to fix the fibre 11 and the sleeves 19, 20 in place. Tape strips 22, are used to hold the fibre 11 in place as it emerges from the passage 15. The fibre 11 should arc naturally from the passage and lie flat against the bonding surface 3. The fibre 11 should not be pulled tight against the edge of the passage 15. With the fibre 11 in position the adhesive 21 can be gently injected or pushed into the passage 15. The aim is to leave the surface of the adhesive flush with the bonding surface 3. Tape 18 is applied over the passage 15 to ensure that the adhesive 21 does not protrude. Once the adhesive 21 has cured, the tape 18 is removed (it should be peeled away in the direction the fibre 11 emerges from the passage 15). This ensures that the fibre is not subjected to sharp bending at the point that it emerges from the passage. Araldite 2014 adhesive was chosen to encapsulate the fibre 11 because of its low shrinkage.

Optical fibre is springy and is unlikely to stay in place without being held. This is especially important as the fibre 11 emerges from the passage 15.

As shown in FIGS. 4a and 4b, the fibre 11 is first held in position on the bonding surface 3 using strips of tape 22. Then, to tack the fibre 11 down, small (1 mm) beads 23 of quick setting epoxy adhesive are applied. These beads 23 are placed where required along the fibre 11, as shown in FIG.

4. Excess adhesive may be removed with a gentle wipe of a tissue. It is important ensure that the top of the adhesive 23 does not protrude above the fibre 11. Once the adhesive has set, the strips of tape 22 may be removed, taking care not to excessively bend or load the optical fibre 11.

Figure 9:
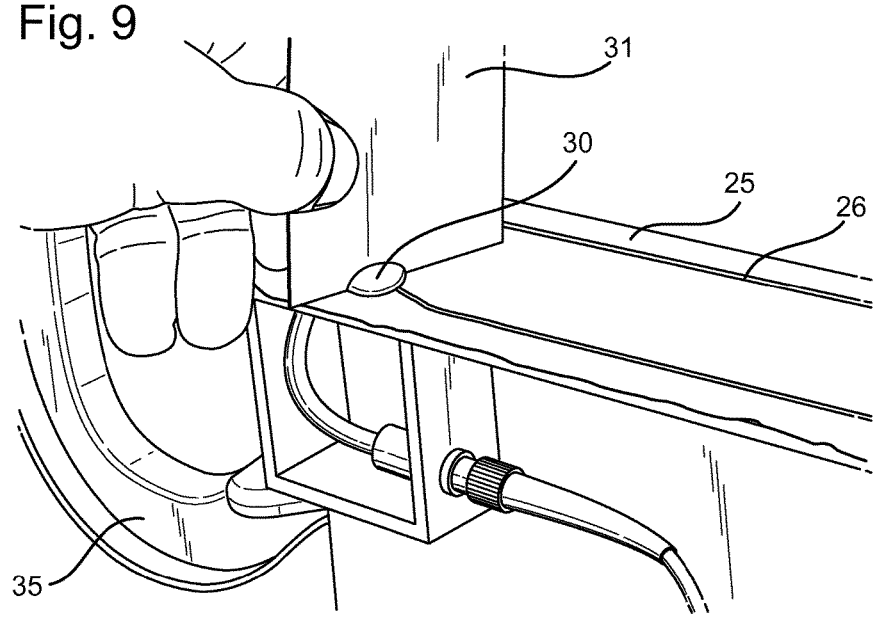
FIG. 9 is a perspective view of the part assembly of FIGS. 4a and 4b, having resin adhesive applied thereto.

As shown in FIG. 9, with the optical fibre 11 in position the fibre track 26 can be coated with the structural adhesive selected for the bonded joint 5. Coating the fibre track 26 provides accurate location and protection for the optical fibre 11 during the remainder of the manufacturing process. As shown in FIG. 9, a ball 30 of mixed adhesive is applied to the fibre track 26 and worked along using a card 31 so that a thin layer of structural adhesive 6 covers the entire fibre 11 on the track 26.

It is important to remove the track mask 25 before the structural adhesive 6 starts to set. For an adhesive that requires twenty four hours to fully set, for example, the track mask 25 should be removed within one hour of the adhesive's application.

Figure 10A:
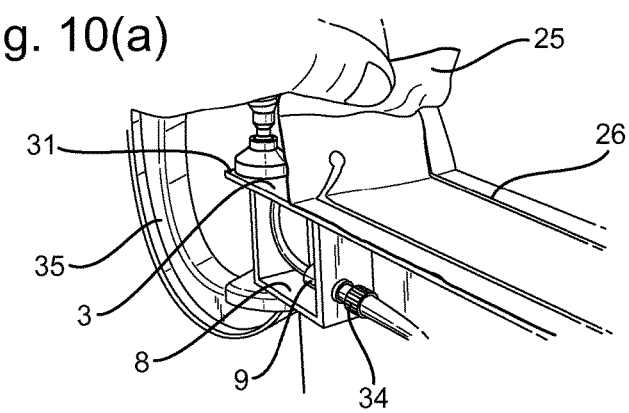
FIGS. 10a and 10b show an I beam during and after removal of the track mask of FIGS. 7a and 7b.

FIG. 10a shows how this is done. Working from a connector end 31 of the structure 1, the track mask 25 is gently peeled from the bonding surface 3. The adhesive 6 is then be allowed to cure completely before a clamp 35 holding the connector assembly is removed.

Figure 10B:
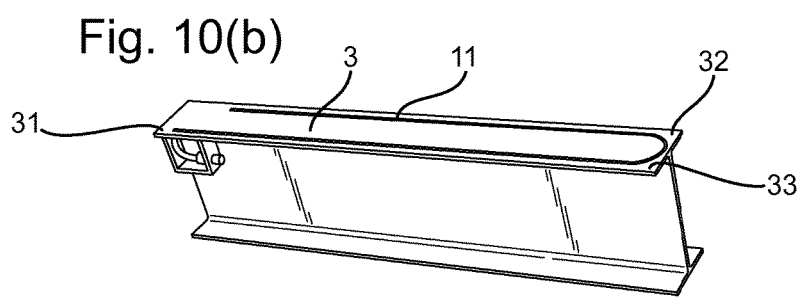

FIG. 10b shows the first component 1, in the form of an I beam, having the optical fibre 11 held in position on the bonding surface 3 thereof. It can be seen that the path of the optical fibre 11 is an elongated U-shape, with the fibre passing substantially along the full length of two flanges 32, 33 of the I beam component 1. In this way, any defects in the assembly structure caused by local breakdown of the adhesive 6 or by other structural failure of the beam flanges 32, 33 or by failure in the second component 2 will affect the optical fibre 11 and be detectable as a fault in the structure. The integrity of a joint between a wing spar or rib, as exemplified here by the area covered by the flanges 32, 33 of the I beam, and a wing skin may be regarded as critical to the structure. Thus, the fact that the optical fibre 11 traverses this whole region will enable warning of failure to be given, by the assembly of the invention, to an operator of an aircraft including such a joint, for example.

If the I beam of FIGS. 10a and 10b is to be used to form the wing box of an aircraft, for example, it may be important to route fibre optic cables connectable to the optical fibre 11 before the box is closed. In such a case, the I beam may form the first component 1 and a wing skin (not shown) may form the second component of the assembly. FIG. 10a shows such a fibre optic cable 34 connected to a fibre end connector 9.

Finally, the two components 1, 2 are bonded together using epoxy adhesive 6. During the bonding step, weights or vacuum can be applied to compress the joint.

Figure 5:
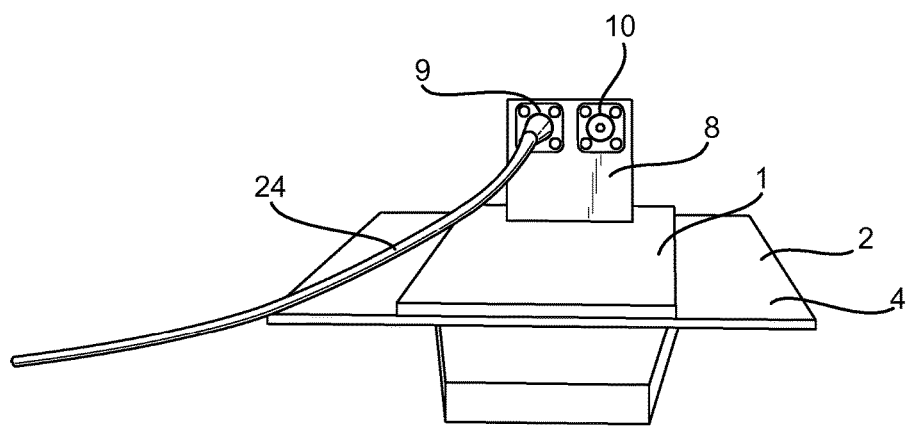
FIG. 5 is a perspective end view of the assembly of FIG. 2, connected to a light source.
Figure 6:
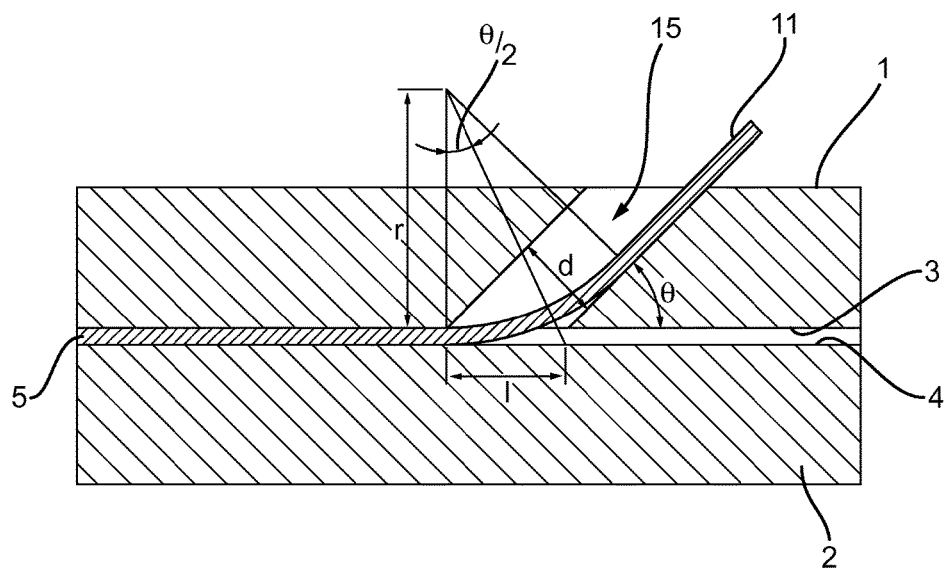
FIG. 6 is a diagram of an assembly according to the invention, showing various angles and dimensions.

Referring to FIGS. 1 and 5, the point at which the fibre 11 enters the joint 5 can be subject to tight bending and lateral forces during the bonding process. The integrity of the optical fibre 11 can be determined using a continuity test. Light is passed down the fibre 11 from a cable 24 attached to one 9 of the end connectors and, if light appears at the end connector 10 at the other end of the fibre 11, as shown in FIG. 5, the integrity of the joint 5 and of the optical fibre 11 is confirmed. The excess loss associated with incorporating the fibre into the bond line is likely to be of the order of 1.5 dB for the fibre loop.

Optical fibre cannot be subjected to sharp bends for two reasons. Firstly, in time, the optical fibre is likely to break at any sharp bend and, secondly, a sharp bend will cause a significant optical loss. Thus, for best operation of optical fibre, it is best to limit the sharpness of bends. This section quantifies how the features of the passage 15 determine the bend radius of the optical fibre 11.

Using the equation:

$$l = \frac{d}{\sin(\theta)} \quad (1)$$

Where d is the diameter of the passage/hole,
θ is the angle of the hole from horizontal and l is the longest axis of the hole at its end.

From the geometry we find:

$$\tan\left(\frac{\theta}{2}\right) = \frac{l}{r} \quad (2)$$

Thus, $$r = \frac{d}{1 - \cos(\theta)} \quad (3)$$

So, for a minimum bend radius of 15 mm and an angle of 45° then a hole radius of 4.4 mm is required.

What is claimed is:

1. An assembly having a bonded joint monitored for bond integrity, the assembly comprising:
   first and second rigid structural airframe components, each defining a bonding surface thereon;
   the joint being formed between the bonding surfaces;
   the first structural component defining a passage therethrough from the bonding surface to an exterior of the component;
   the joint including an optical fibre extending along the joint between the bonding surfaces, through the passage and emerging from the passage to the exterior of the component.

2. The assembly according to claim 1, in which the passage is directed and dimensioned whereby to allow the optical fibre to pass therethrough while defining a bend radius which allows light to pass along the optical fibre.

3. The assembly according to claim 2, in which the passage is angled with respect to the joint.

4. The assembly according to claim 1, including a support for the emerging optical fibre.

5. The assembly according to claim 4, in which the support includes an end connector for the optical fibre attached to the support.

6. The assembly according to claim 4, including a casing for the emerging optical fibre.

7. The assembly according to claim 6, in which the casing penetrates the passage.

8. The assembly according to claim 4, in which the optical fibre is potted within the passage.

9. The assembly according to claim 1, in which the optical fibre forms a loop within the joint.

10. The assembly according to claim 1, including a number of optical fibres passing through a single passage.

11. The assembly according to claim 1, in which at least one of the first and second components comprises a fibre-reinforced composite structure.

12. The assembly according to claim 11, comprising an aircraft structural airframe component.

13. A method of constructing an assembly having a bonded joint monitored for bond integrity, the assembly comprising:

first and second rigid structural airframe components, each defining a bonding surface thereon;

the joint being formed between the bonding surfaces;

the first structural component defining a passage therethrough from the bonding surface to an exterior of the component;

the joint including an optical fibre extending along the joint between the bonding surfaces, through the passage and emerging from the passage to the exterior of the component;

the method including the steps of:

passing the optical fibre through the passage and adhering the optical fibre to the bonding surface of the first structural component;

bringing the two bonding surfaces together and forming the bond.

14. The method according to claim 13, in which the step of adhering the optical fibre to the bonding surface of the first component comprises applying adhesive to adhere the optical fibre to the bonding surface at selected locations on the bonding surface and securing the optical fibre in position while the adhesive sets.

15. The method according to claim 14, in which the step of securing the optical fibre in position comprises applying adhesive tape to the bonding surface of the first component whereby to secure the optical fibre in position while the adhesive sets.

16. The method according to claim 13, in which adhering the optical fibre to the bonding surface includes the step of applying a track mask to the bonding surface to delineate a track on the bonding surface for application of the optical fibre thereto.

17. The method according to claim 16, in which the delineated track is positioned to traverse a region of critical joint integrity.

18. The method according to claim 16, in which the optical fibre is coated along its length with structural adhesive with the track mask in place.

* * * * *